US012123578B2

(12) United States Patent
Li et al.

(10) Patent No.: US 12,123,578 B2
(45) Date of Patent: Oct. 22, 2024

(54) LIGHT ENGINE AND LAMP WITH LIGHT ENGINE

(71) Applicant: LEDVANCE GmbH, Garching bei Munchen (DE)

(72) Inventors: Zhian Li, Shenzhen Guangdong (CN); Armin Konrad, Großaitingen (DE); Shijun Nie, Garching (DE); Tianci Zeng, Shenzhen Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 18/369,239

(22) Filed: Sep. 18, 2023

(65) Prior Publication Data

US 2024/0102639 A1 Mar. 28, 2024

(30) Foreign Application Priority Data

Sep. 22, 2022 (CN) ......................... 202211157271.9

(51) Int. Cl.

| | |
|---|---|
| ***F21V 21/24*** | (2006.01) |
| ***F21S 2/00*** | (2016.01) |
| ***F21S 4/28*** | (2016.01) |
| ***F21Y 103/10*** | (2016.01) |
| ***F21Y 115/10*** | (2016.01) |

(52) U.S. Cl.

CPC .............. *F21V 21/24* (2013.01); *F21S 2/005* (2013.01); *F21S 4/28* (2016.01); *F21Y 2103/10* (2016.08); *F21Y 2115/10* (2016.08)

(58) Field of Classification Search

CPC ........... F21V 21/24; F21V 21/30; F21S 2/005

See application file for complete search history.

(56) References Cited

U.S. PATENT DOCUMENTS

| | | | | |
|---|---|---|---|---|
| 11,415,296 B1 * | 8/2022 | Chen | G09F 13/0447 |
| 2021/0116108 A1 * | 4/2021 | Osborne | G03B 15/03 |
| 2021/0274721 A1 * | 9/2021 | Tsao | F21V 21/24 |
| 2022/0290848 A1 * | 9/2022 | Ding | A01G 9/249 |
| 2023/0084171 A1 * | 3/2023 | Xie | A01G 9/249 257/98 |

* cited by examiner

*Primary Examiner* — William N Harris
(74) *Attorney, Agent, or Firm* — Hayes Soloway PC

(57) ABSTRACT

Provided is a light engine of a lamp. The light engine includes a number of light engine modules, and a support frame for movably mounting the light engine modules, where each light engine module comprises one or more light sources. The support frame includes a number of movable components, the movable components of the support frame are mechanically engaged to the light engine modules, such that mechanical motion of the movable components of the support frame relative to each other can cause the motion of the light engine modules relative to each other. In addition, a lamp with a light engine is provided.

20 Claims, 9 Drawing Sheets

LIGHT ENGINE AND LAMP WITH LIGHT ENGINE

CROSS-REFERENCE TO RELATED APPLICATIONS

This patent application claims the benefit of and priority to Chinese Patent Application No. 202211157271.9, filed with the China National Intellectual Property Administration on Sep. 22, 2022, which is herein incorporated by reference in its entirety.

FIELD OF THE DISCLOSURE

The present disclosure generally relates to the technical field of lamps, and in particular, the present disclosure relates to a light engine of a lamp, and a lamp with a light engine.

BACKGROUND

In view of environmental challenges, such as the shortage of raw materials and resources, the compatibility between lamps and circular economy becomes more and more important. For example, in the case of upgrading or maintaining a lamp, end users are encouraged to replace components or assemblies of the lamp, such as a driver or a light engine assembly, instead of the whole lamp. However, the replacement of certain components of the lamp may lead to logistical challenges related to inventory or transportation of replaceable components.

SUMMARY

An objective of the present disclosure is to provide a replaceable light engine of a lamp that allows an end user to easily replace the light engine and can reduce the logistical work related to the replacement of the light engine.

According to a first aspect, a light engine of a lamp is provided. The light engine includes multiple light engine modules, where each light engine module has one or more light sources. The light engine further includes a support frame 6 for movably mounting the light engine modules 2. The support frame includes multiple movable components. The movable components of the support frame are mechanically engaged to the light engine modules, thus enabling mechanical motion of the movable components of the support frame relative to each other to cause motion of the light engine modules relative to each other.

Due to the engagement of the movable component of the support frame and the light engine module, a relative position of the light engine module mounted on the support frame can be changed by moving the movable component of the support frame. On the other hand, by changing the relative position of the light engine module, the size and shape of the entire light engine and the position or spatial distribution of one or more light sources can also be changed. In particular, in order to store or transport the light engine, the size of the light engine can be minimized, and when the light engine is mounted in the lamp, the size of the light engine can be increased according to the size of the lamp. In addition, the spatial distribution of light sources can be adjusted according to the requirements of customers, for example, in order to achieve the ideal light distribution of lamp.

The support frame may be configured as a foldable frame, and thus in a folded state of the support frame, the light engine modules are arranged substantially adjacent to each other, and in an unfolded state of the support frame, the light engine modules are spaced from each other. By making the light engine modules adjacent to each other, a compact arrangement of the light engine modules can be achieved, thus saving the space for packaging, storing and transporting the light engines.

The support frame may be configured to arrange the light engine modules in a coplanar manner. Due to the coplanar arrangement of the light engine modules, particularly dense packaging of the light engine can be achieved, for example, for transportation and/or storage.

The support frame may be configured such that the substantially coplanar arrangement of the light engine modules is maintained during relative movement of the movable components of the support frame. In particular, the support frame may be configured such that folding and/or unfolding of the support frame can cause the substantially planar motion of the light engine modules, and the light engine modules are substantially maintained in the same plane. Such a light engine is particularly suitable for a planar light source or a light board, the size of the light engine can be accordingly adjusted so as to be suitable for light boards of different sizes.

The support frame may be configured such that movement of the movable components of the support frame causes a substantially translational motion of the light engine modules relative to each other. Due to the substantially translational motion of the light engine modules, the overall configuration of the light engine can be maintained while the size of the light engine is changed. Therefore, the light engine can be easily adjusted according to the requirements of customers.

The movable components may pivot rotationally about multiple first pivot points on the light engine modules, and in this case, rotational motion of the movable components about the first pivot points causes translational motion of the light engine modules relative to each other. In particular, each pivot point may be connected to one light engine module, such that the rotational motion of the movable component can be transferred to the light engine module through the pivot point. By transferring the rotational motion of the movable components to the translational motion of the light engine modules through pivot points fixed to the light engine modules, the equidistant arrangement of the light engine modules can be ensured to achieve uniform light distribution of the light engine.

The support frame may include a number of pivot points slidably connected to the light engine modules to maintain directions of the light engine modules with each other during the movement of the movable components. Since the directions of the light engine modules are maintained, for example in a parallel direction, a regularly shaped lamp, e.g., a rectangular light board, can be uniformly covered by the light sources of the light engine modules.

The light engine modules may be configured as linear optical modules arranged substantially parallel to each other. In particular, each light engine module may be configured as a linear optical module including an elongated printed circuit board (PCB) on which multiple light emitting diodes (LED) are mounted. In some embodiments, standardized linear modules of substantially the same size and shape are used, making the light engine particularly cost-effective and easy to manufacture.

Each light engine module may include one or more slide channels for connecting the pivot point to the light engine module in a sliding manner. Through the slide channel, for example, in the form of a slide groove, a sliding direction of the pivot point and the direction of the support frame when the support frame is folded and unfolded can be achieved. In particular, in a case that the light engine module is the linear optical module, the slide channel may be arranged along a longitudinal axis of the linear optical module to ensure the parallel direction of the light engine modules when the support frame is folded and/or unfolded.

According to a second aspect, a lamp is provided. The lamp includes a lamp housing and at least one light engine according to the first aspect. At least one support frame of the at least one light engine is mounted in the lamp housing. Due to the adjustability of the size of the light engine, the light engine is suitable for different lamps. In addition, in order to save precious storage space, the size of the light engine can be minimized, making the transportation and storage of the light engine particularly cost-effective, thereby reducing the manufacturing cost of lamps in an all-round way.

The lamp may be configured as a light board. The lamp housing may include a substantially planar bottom on which at least one support frame of the light engine is mounted. Such a light engine is particularly suitable for a planar light source, the size of the light engine can be accordingly adjusted so as to be suitable for light boards of different sizes.

In the following description, details are provided to describe embodiments of the present specification. However, it should be apparent to those skilled in the art that the present disclosure may be practiced without such details.

Certain portions of this embodiment have similar components. Similar components may have the same name or similar component number. The description of one component is applicable by reference to another similar component, thereby reducing repetition of text without limiting the disclosure.

DETAILED DESCRIPTION

Figure 1:
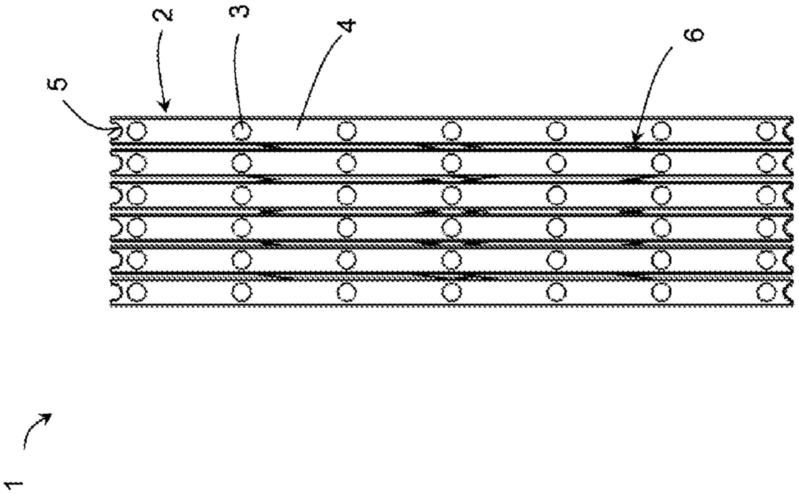
FIG. 1 shows a top view of a light engine according to one embodiment in a folded state.

FIG. 1 shows a top view of a light engine according to one embodiment in a folded state. In an embodiment of FIG. 1, the light engine 1 includes a number of light engine modules 2. Each light engine module 2 is configured as a linear optical module, including multiple light sources 3 mounted on an elongated board 4 or a substrate. In this embodiment, each light source 3 is an LED (Light-emitting Diode) light source. The board 4 is configured as a printed circuit board (PCB), including an isolation material layer and conductive wires (not shown). In some embodiments, the circuit board 4 is configured as a metal core PCB with a metal or metal alloy as a core material. Grooves 5 for fixing the light engine modules 2 to a bottom of the lamp are provided at both ends of the elongated board 4.

The light engine 1 further includes a support frame 6, indicated by an arrow 6. The light engine modules 2 are connected to each other through the support frame 6, which is not clearly visible in FIG. 1.

Figure 2:
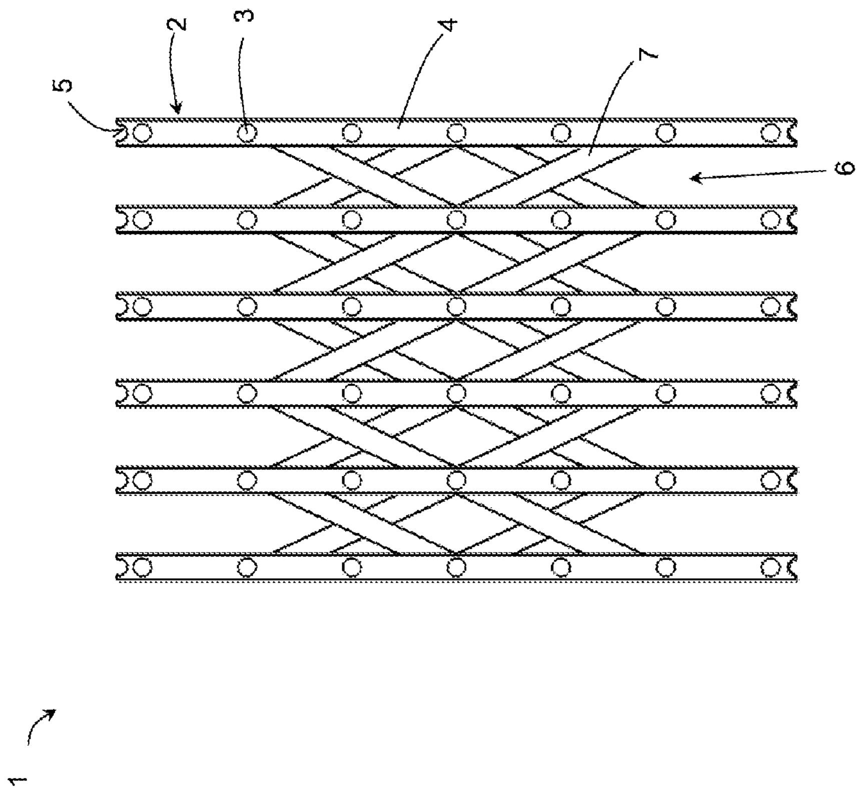
FIG. 2 shows a top view of a light engine of FIG. 1 in an unfolded state.

FIG. 2 shows a top view of a light engine of FIG. 1 in an unfolded state. In the unfolded state of the light engine 1, the movable components 7 of the support frame 6 can be seen from the top view of FIG. 2. In the shown embodiment, the movable components 7 each have an elongated shape and are arranged as an expandable grid on which the light engine modules 2 are mounted.

A distance between the light engine modules 2 or the size of the light engine 1 can be changed depending on the extension level of the grid or the support frame 6. In particular, the size of the light engine 1 may be increased and/or adjusted to make the light engine 1 suitable for a particular lamp.

Figure 3:
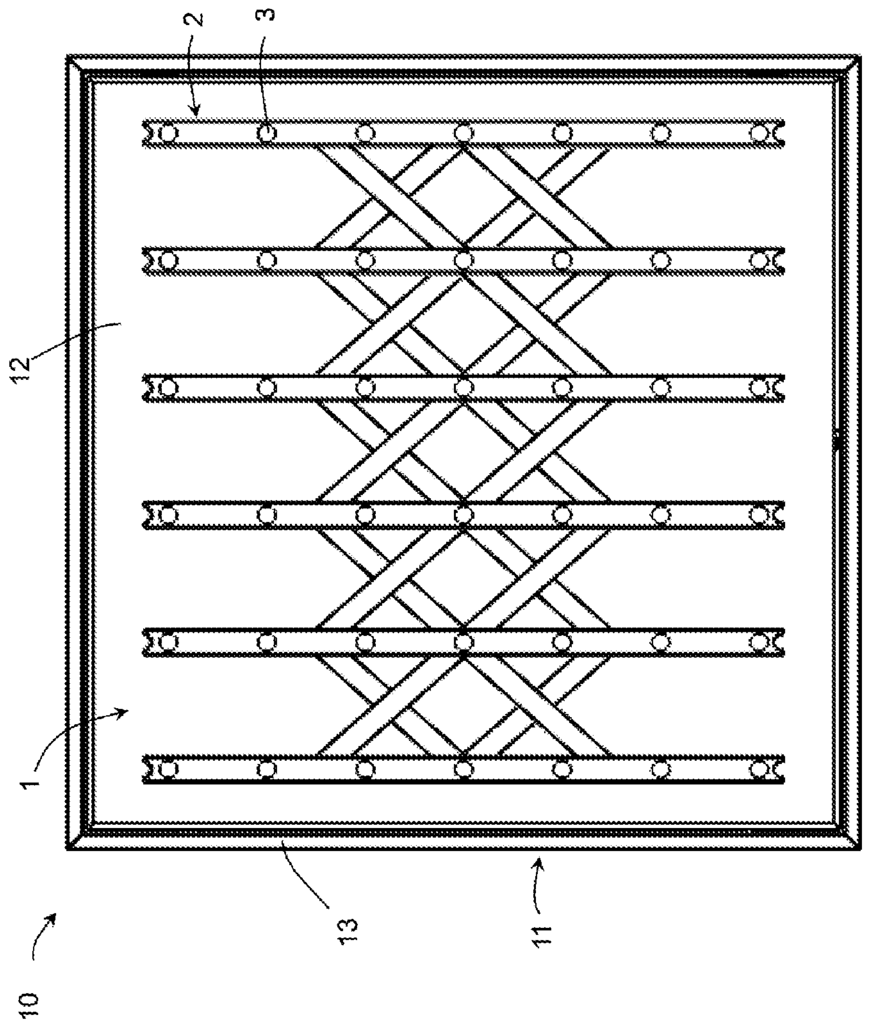
FIG. 3 shows a top view of a lamp with a light engine of FIG. 1.

FIG. 3 shows a top view of a lamp with a light engine of FIG. 1. The lamp 10 includes a lamp housing 11 with a housing bottom 12 and a side frame 13 or flange. The light engine 1 according to FIG. 1 is mounted on the housing bottom 12 of the lamp housing 11. The light engine 1 is in an expanded state to make the light sources 3 uniformly distributed on the housing bottom 12 of the lamp housing 11. The light engine 1 is mounted by mounting the support frame 6 at the housing bottom 12 of the lamp housing 11. The light engine module 2 may also be fixed to the housing bottom 12 of the lamp housing 11 by a fixing element (thermal display) and a contact element (not shown). A fixing element is provided in particular at the groove 5 of the light engine module 2, and thus the light engine module 2 can be fixed to an expanded position of the lamp 10, and the light engine 1 can be fixed as a whole, as shown in FIG. 3.

Figure 4:
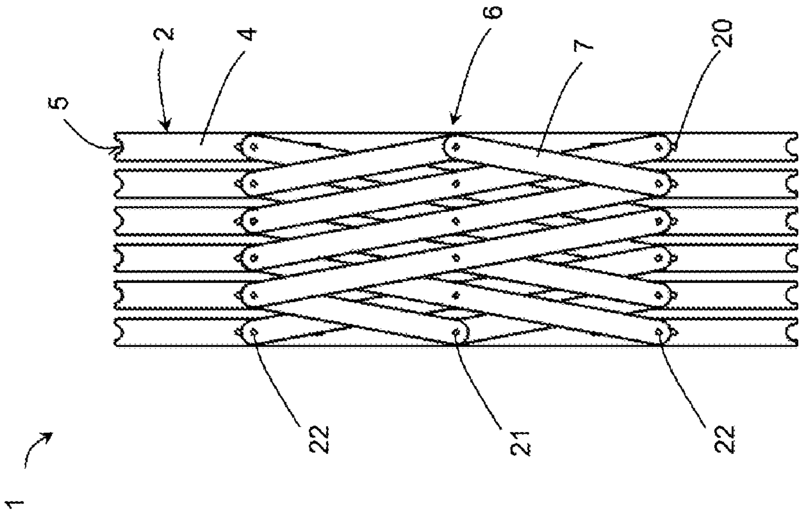
FIG. 4 shows a bottom view of a light engine of FIG. 1.

FIG. 4 shows a bottom view of a light engine of FIG. 1. Further structural details of the light engine 1 can be seen from the bottom view of FIG. 4. In particular, each of the light engine modules 2 shown in FIG. 4 includes a slide channel 20 or a flow channel, and a slide groove is formed in a main body of the light engine module 2. The movable components 7 of the support frame 6 are pivotably mounted around a number of pivot points 21 and 22. The pivot points 21 and 22 include multiple first pivot points 21 fixedly connected to the light engine modules 2, and multiple second pivot points 22 slidably connected to the light engine modules 2.

The pivot points 21 and 22 may be achieved by means of hinge pins or rivets. The configuration of the second pivot points 22 is that the second pivot points 22 can respectively slide back and forth along the slide channel or the sliding track when the support frame 6 is unfolded or folded.

Figure 5:
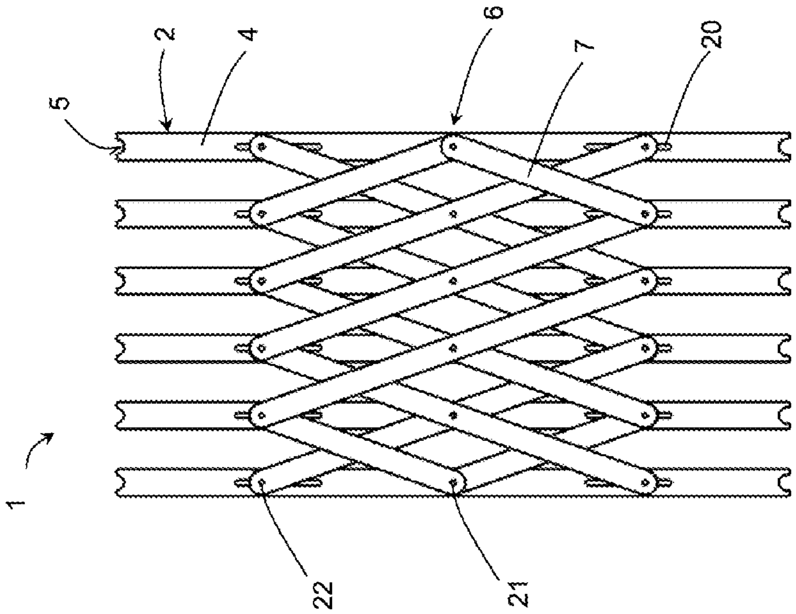
FIG. 5 shows a bottom view of a light engine of FIG. 1 in a partially unfolded state.

FIG. 5 shows a bottom view of a light engine of FIG. 1 in a partially unfolded state. The slide channel 20 in the main body of the light engine module 2 can be seen from the view of FIG. 5. In the partially unfolded state, the second pivot point 22 is in an intermediate position in the slide channel. From a position shown in FIG. 5, the support frame 6 may be further unfolded until the second pivot point 22 reaches an outer end of the slide channel. Thus, by selecting the length and position of the slide channel 20, particularly along the main body of the light engine module, the maximum size of the light engine 1 in the expanded or unfolded state can be set. The setting of the maximum size of the light engine 1 can simplify the assembly process of the lamp, especially when the light engine 1 is to be mounted at the maximum expanded state, since there is no need to finely adjust the folding of the support frame.

Figure 6:
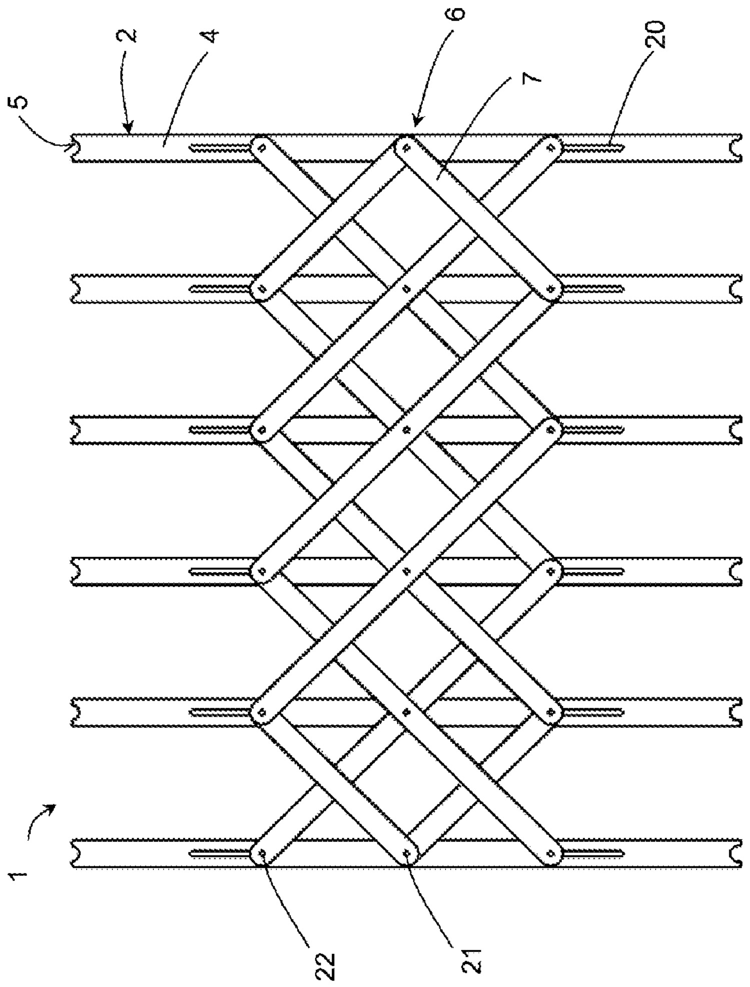
FIG. 6 shows a bottom view of a light engine of FIG. 1 in a fully unfolded state.

FIG. 6 shows a bottom view of a light engine of FIG. 1 in a fully unfolded state. In the fully unfolded state of the light engine 1, the second pivot point 22 is positioned at an inner end of the slide channel 20 in the main body of the light engine module 2 in a limit state.

Figure 7:
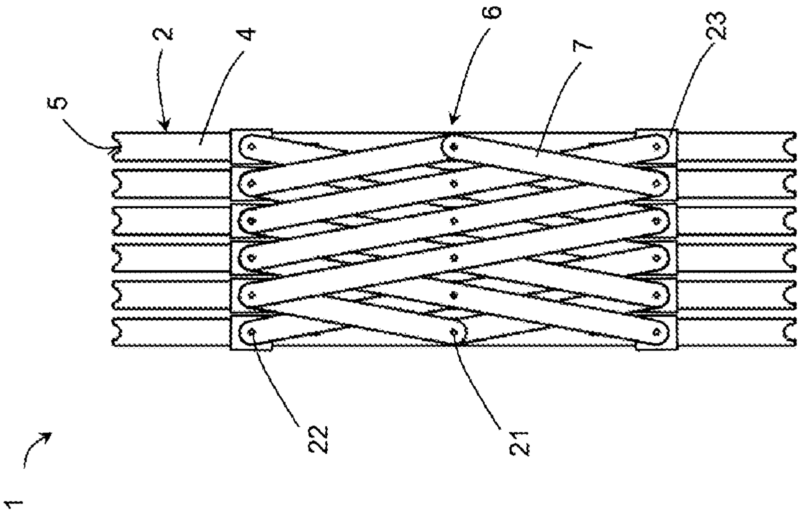
FIG. 7 shows a bottom view of a light engine according to another embodiment in a folded state.

FIG. 7 shows a bottom view of a light engine according to another embodiment in a folded state. The embodiment of FIG. 7 substantially corresponds to the embodiment of FIG. 1 and further includes a slider 23 for slidably connecting the second pivot point 22 to the slide channel 20 on the main body of the light engine module 2. The slider 23 may be configured to improve a sliding connection between the light engine module 2 and the movable component 7 of the support frame 6. The sliders 23 may be configured to maintain the main body of the light engine module, so as to slide along the main body of the light engine module 2, in particular to be attached to an outer surface of the board 4 of the light engine module 2. Therefore, the slider can stabilize a joint at the second pivot point 22.

Figure 8:
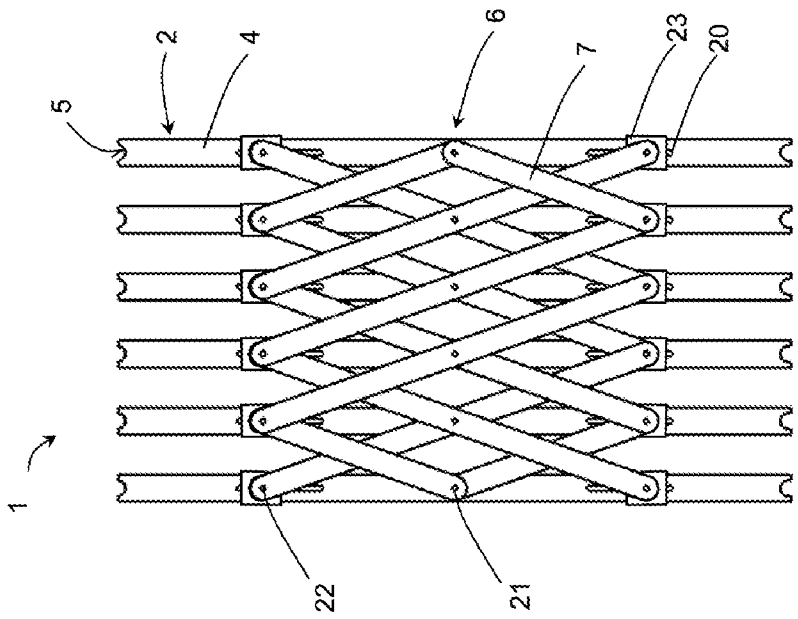
FIG. 8 shows a bottom view of a light engine of FIG. 7 in a partially unfolded state.

FIG. 8 shows a bottom view of a light engine of FIG. 7 in a partially unfolded state. In the partially unfolded state of FIG. 8, the slider 23 is located at an intermediate position between the inner end and the outer end of the slide channel 20, illustrating a sliding process of the slider 23 along the slide channel 20. By attaching the slider 23 to the main body of the light engine module 2, in particular to an outer wall of the board 4, a mechanical pressure on the second pivot point 22 can be reduced, and the overall robustness of the light engine 1 can be improved.

Figure 9:
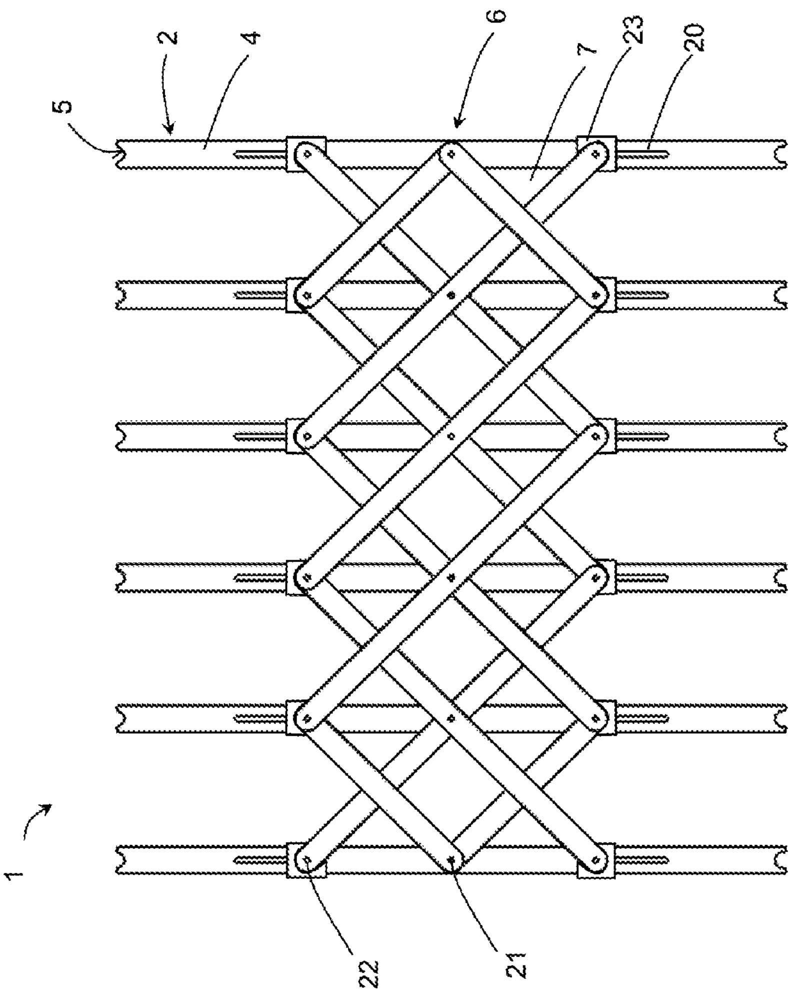
FIG. 9 shows a bottom view of a light engine of FIG. 7 in a fully unfolded state.

FIG. 9 shows a bottom view of a light engine of FIG. 7 in a fully unfolded state. In the fully unfolded state of the light engine 1, the second pivot point 22 and the slider 23 are in a limit state at the inner end of the slide channel 20 of the main body of the light engine module 2, thus limiting the maximum size of the light engine 1.

The light engine 1 described above can be mounted in lamps of different sizes and/or shapes. In particular, the light engine 1 may be used in a backlight lamp, for example a sign or panel lamp. Due to adjustable size, the light engine can be used in lamps of different sizes. In particular, due to the foldable support frame, the light engine can be folded or unfolded as needed, thereby adjusting the distance between the light engine modules according to the size of the lamp.

In particular, the light engine 1 may be mounted in a substantially rectangular lamp housing 11, for example, as shown in FIG. 3. The lamp or the lamp housing may include an openable cover, for example, a translucent cover, and thus the user can easily open the lamp housing from the front and easily replace the entire light engine 1 if necessary. In particular, all light engine modules of the light engine can be simultaneously mounted by mounting the support frame at the bottom of the lamp. Therefore, the mounting and fixing structure of the lamp can be simplified, and the overall complexity of the lamp may also be reduced. In addition, due to the foldable structure of the light engine and the rod-shaped structure of the movable component, the light engine can be expanded over a large area without increasing material consumption and cost, for example, for PCB. Thus, through the light engine described above, a particularly cost-effective large area lamp or light board can be produced.

Due to the pivotal arrangement of the movable components 7, the rotational motion of the movable components 7 causes substantially translational motion of the light engine modules 2, thereby maintaining a substantially equidistant and/or parallel arrangement of the light engine modules 2 when the support frame 6 is folded and/or unfolded. In this way, a particularly uniform spatial distribution of the light sources 3 can be achieved, thereby achieving a uniform light distribution of the lamp.

Therefore, as shown in FIG. 1, FIG. 4 and FIG. 7, the folded state of the light engine 1 is particularly suitable for compactly storing, packaging and/or transporting the entire light engine 1 as a SKU (stock keeping unit), thereby greatly simplifying the logistics of lamp manufacturers.

Although at least one demonstrative embodiment has been described in the foregoing detailed description, it should be understood that there are numerous variations. It should also be understood that the demonstrative embodiments or exemplary embodiments are only examples and are not intended in any way to limit the scope, applicability or configuration of the present disclosure. In contrast, the above detailed description will provide a convenient route map for those skilled in the art to implement demonstrative embodiments or exemplary embodiments.

What is claimed is:

1. A light engine of a lamp, the light engine comprising:

a plurality of light engine modules, wherein:

each light engine module has one or more light sources; and at least one of the light engine modules has at least one slide channel formed therein; and a support frame configured for movably mounting the light engine modules, wherein the support frame comprises a plurality of movable components, wherein at least one of the movable components of the support frame is mechanically engaged to the at least one slide channel formed in the at least one of the light engine modules, thus enabling mechanical motion of the movable components of the support frame relative to each other to cause motion of the light engine modules relative to each other.

2. The light engine according to claim 1, wherein the support frame is configured as a foldable frame to facilitate the light engine modules to be arranged substantially adjacent to each other in a folded state of the support frame and to facilitate the light engine modules to be spaced from each other in an unfolded state of the support frame.

3. The light engine according to claim 1, wherein the support frame is configured to arrange the light engine modules in a substantially coplanar arrangement.

4. The light engine according to claim 3, wherein the support frame is configured such that the substantially coplanar arrangement of the light engine modules is maintained during relative movement of the movable components of the support frame.

5. The light engine according to claim 1, wherein the support frame is configured such that the movement of the movable components of the support frame causes substantially translational motion of the light engine modules relative to each other.

6. The light engine according to claim 1, wherein the movable components pivot rotationally about a plurality of first pivot points fixed to the light engine modules in a way that rotational motion of the movable components about the first pivot points causes translational motion of the light engine modules relative to each other.

7. The light engine according to claim 6, wherein the support frame comprises a plurality of second pivot points, wherein at least one of the second pivot points is slidably connected to the at least one slide channel formed in the at least one of the light engine modules so as to maintain directions of the light engine modules with each other during the motion of the movable components.

8. The light engine according to claim 1, wherein the light engine modules are configured as linear optical modules arranged substantially parallel to each other.

9. A lamp comprising:

a lamp housing; and at least one light engine according to claim 1, wherein the at least one support frame of the at least one light engine is mounted in the lamp housing.

10. The light engine according to claim 7, wherein the plurality of second pivot points is configured to maintain parallel arrangement of the light engine modules during unfolding and folding of the support frame.

11. The light engine according to claim 7, further comprising at least one slider configured for slidably connecting at least one of the second pivot points to the at least one slide channel formed in the at least one of the light engine modules, wherein the at least one slider is configured to stabilize at least one joint at said at least one second pivot point.

12. The light engine according to claim 11, wherein the at least one slider is configured to attach directly to a main body of the at least one light engine module.

13. The light engine according to claim 12, wherein the at least one slider is configured to attach to an outer surface of the main body of the at least one light engine module.

14. The light engine according to claim 11, wherein the at least one slider is configured to attach to an outer surface of a circuit board of the at least one light engine module.

15. The light engine according to claim 11, wherein the at least one slider is configured to contribute to reducing mechanical pressure on the at least one second pivot point.

16. The light engine according to claim 1, wherein:

the at least one light engine module having the at least one slide channel formed therein is configured as a linear optical module; and the at least one slide channel extends along a longitudinal axis of the linear optical module.

17. The light engine according to claim 1, wherein the at least one slide channel is configured as an elongate groove formed in a main body of the at least one light engine module.

18. The light engine according to claim 1, wherein the at least one light engine module having the at least one slide channel formed therein further has at least one fixed pivot point formed thereat, about which at least one fixed pivot point the movable components pivot in folding and unfolding the support frame.

19. The light engine according to claim 18, wherein:

the at least one slide channel comprises a first slide channel and a second slide channel; and the at least one fixed pivot point is linearly situated between the first slide channel and the second slide channel along a longitudinal axis of the at least one light engine module having the at least one slide channel formed therein.

20. The light engine according to claim 1, wherein:

the at least one slide channel comprises a plurality of slide channels; and the at least one light engine module having the plurality of slide channels formed therein further has a plurality of fixed pivot points formed thereat.

* * * * *